(12) United States Patent
Shiotani et al.

(10) Patent No.: US 10,652,427 B2
(45) Date of Patent: May 12, 2020

(54) NON-TRANSITORY COMPUTER-READABLE RECORDING MEDIUM STORING COMPUTER-READABLE INSTRUCTIONS FOR TERMINAL DEVICE, AND TERMINAL DEVICE

(71) Applicant: BROTHER KOGYO KABUSHIKI KAISHA, Nagoya-shi, Aichi (JP)

(72) Inventors: Takeshi Shiotani, Nagoya (JP); Tatsuhiko Sone, Nagoya (JP)

(73) Assignee: BROTHER KOGYO KABUSHIKI KAISHA, Nagoya-shi, Aichi (JP)

( * ) Notice: Subject to any disclaimer, the term of this patent is extended or adjusted under 35 U.S.C. 154(b) by 0 days.

(21) Appl. No.: 16/288,183

(22) Filed: Feb. 28, 2019

(65) Prior Publication Data
US 2019/0273839 A1 Sep. 5, 2019

(30) Foreign Application Priority Data
Mar. 2, 2018 (JP) .................. 2018-037854

(51) Int. Cl.
*H04N 1/327* (2006.01)
*H04N 1/00* (2006.01)

(52) U.S. Cl.
CPC ....... *H04N 1/32767* (2013.01); *H04N 1/0044* (2013.01); *H04N 1/00129* (2013.01);
(Continued)

(58) Field of Classification Search
CPC .......... H04N 1/32767; H04N 1/00477; H04N 1/00129; H04N 1/00251; H04N 1/0044; H04N 1/00482; H04N 2201/0094; H04N 2201/0036; H04N 2201/006; H04N 2201/0046
(Continued)

(56) References Cited

U.S. PATENT DOCUMENTS

2016/0246554 A1 8/2016 Yasuda

FOREIGN PATENT DOCUMENTS

JP 2016158054 A 9/2016
JP 2017064946 A 4/2017

OTHER PUBLICATIONS

Wi-Fi Alliance, "Wi-Fi Peer-to-Peer (P2P) Technical Specification version 1.5", Aug. 4, 2014 (Aug. 4, 2014), pp. 1-183, Retrieved from the Internet <URL:https://www.wi-fi.org/downloads-registered/Wi-Fi_P2P_Technical_Specification_v1.5.pdf> [retrieved on Dec. 9, 2015].

*Primary Examiner* — Tammy Paige Goddard
*Assistant Examiner* — Darryl V Dottin
(74) *Attorney, Agent, or Firm* — Scully, Scott, Murphy & Presser, P.C.

(57) ABSTRACT

A terminal device may be configured to acquire a first signal from a hardware of the terminal device, determine, by using the first signal, whether the distance between the terminal device and a communication device is less than or equal to a threshold value, and in a case where it is determined that the distance between the terminal device and the communication device is less than or equal to the threshold, supply a trigger instruction to an Operating System (OS) program of the terminal device even if a button that may be displayed on a display of the terminal device for supplying the trigger instruction to the OS program is not selected. The OS program may (1) display a notification screen on the display unit and (2) supply a change instruction to the first wireless interface.

20 Claims, 12 Drawing Sheets

(52) U.S. Cl.
CPC ..... *H04N 1/00251* (2013.01); *H04N 1/00477* (2013.01); *H04N 1/00482* (2013.01); *H04N 2201/006* (2013.01); *H04N 2201/0036* (2013.01); *H04N 2201/0046* (2013.01); *H04N 2201/0094* (2013.01)

(58) Field of Classification Search
USPC ...................................................... 358/1.15
See application file for complete search history.

(Fourth Embodiment)

(Fourth Embodiment)

(Sixth Embodiment)

(Sixth Embodiment)

NON-TRANSITORY COMPUTER-READABLE RECORDING MEDIUM STORING COMPUTER-READABLE INSTRUCTIONS FOR TERMINAL DEVICE, AND TERMINAL DEVICE

CROSS-REFERENCE TO RELATED APPLICATION

This application claims priority to Japanese Patent Application No. 2018-037854, filed on Mar. 2, 2018, the entire contents of which are hereby incorporated by reference into the present application.

TECHNICAL FIELD

The disclosure herein discloses a technique for executing a wireless communication between a terminal device and a communication device.

BACKGROUND ART

A system provided with a terminal device and an image forming device is known. The image forming device shifts from a power saving mode to a normal operation power mode in a case of determining that a user of the terminal device is present within a first detection range while the image forming device is in the power saving mode. Further, the image forming device shifts from the normal operation power mode to an ultrasonic communication operation to emit ultrasonic waves for executing a communication with the terminal device in a case of determining that the user is present within a second detection range, which is narrower than the first detection range, while the image forming device is in the normal operation power mode.

SUMMARY

In the above system, processes that take place in the terminal device are not described at all. The disclosure herein provides a technique that enables a user to easily cause a terminal device to execute a wireless communication with a communication device.

The present disclosure discloses a non-transitory computer-readable recording medium storing computer-readable instructions for a terminal device. The terminal device may comprise: a display unit; a first wireless interface; a computer; an Operating System (OS) program configured to be executed by the computer; and hardware configured to supply a first signal to the computer, the first signal indicating information related to a distance between the terminal device and a communication device; wherein the computer-readable instructions, when executed by the computer, may cause the terminal device to execute: acquiring the first signal from the hardware; determining, by using the first signal, whether the distance between the terminal device and the communication device is less than or equal to a threshold value; and in a case where it is determined that the distance between the terminal device and the communication device is less than or equal to the threshold value, supplying a trigger instruction to the OS program even if a button that may be displayed on the display unit for supplying the trigger instruction to the OS program is not selected, wherein the trigger instruction may be for causing the OS program to execute: (1) displaying a notification screen on the display unit, the notification screen being for notifying a user that a wireless communication via the first wireless interface is executable with the communication device; and (2) supplying a change instruction to the first wireless interface, the change instruction being for changing a mode related to the wireless communication via the first wireless interface from a disabled state to an enabled state.

The present disclosure discloses a non-transitory computer-readable recording medium storing computer-readable instructions for a terminal device. The terminal device may comprise: a display unit; a first wireless interface; a computer; an Operating System (OS) program configured to be executed by the computer; and at least one sensor of a gyroscope sensor and an acceleration sensor; wherein the computer-readable instructions, when executed by the computer, may cause the terminal device to execute: acquiring a first signal from the at least one sensor; determining, by using the first signal, whether a predetermined action is performed by a user to the terminal device; and in a case where it is determined that the predetermined action has been performed by the user, supplying a trigger instruction to the OS program even if a button that may be displayed on the display unit for supplying the trigger instruction to the OS program is not selected, wherein the trigger instruction may be for causing the OS program to execute: (1) displaying a notification screen on the display unit, the notification screen being for notifying the user that a wireless communication via the first wireless interface is executable with a communication device, and (2) supplying a change instruction to the first wireless interface, the change instruction being for changing a mode related to the wireless communication via the first wireless interface from a disabled state to an enabled state.

The terminal device itself is also novel and useful. Further, a communication system that comprises the above terminal device and communication device is also novel and useful.

EMBODIMENTS

Figure 1:
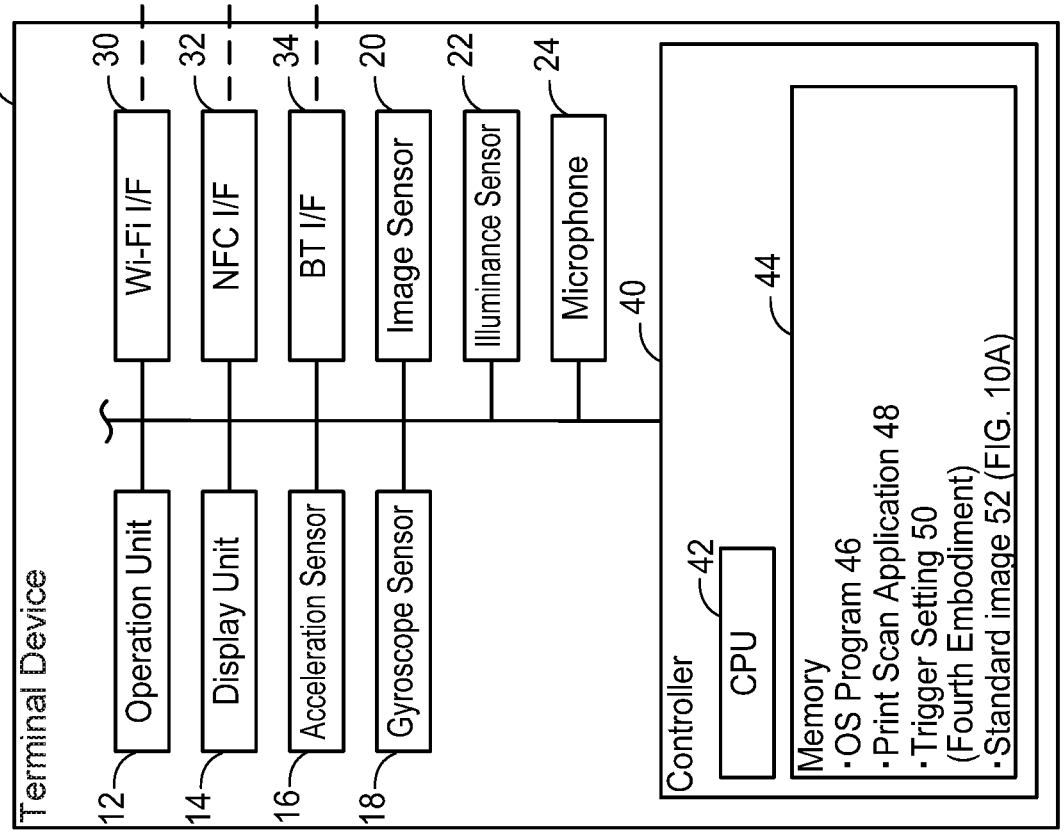
FIG. 1 shows a configuration of a communication system.

First Embodiment (Configuration of Communication System 2; FIG. 1)

As shown in FIG. 1, a communication system 2 includes a terminal device 10 and a multi-function peripheral (hereinbelow "MFP") 100. The terminal device 10 and the MFP 100 are configured to be capable of executing a Wi-Fi communication which is a wireless communication in accordance with a Wi-Fi scheme, an NFC communication which is a wireless communication in accordance with a Near Field Communication (NFC) scheme, and a Bluetooth (BT) communication which is a wireless communication in accordance with a Bluetooth (registered trademark) scheme with each other.

(Configuration of Terminal Device 10)

The terminal device 10 is a portable terminal device such as a cellphone, a smartphone, a PDA, a note PC, a tablet PC, a portable music player, and a portable movie player. The terminal device 10 includes an operation unit 12, a display unit 14, an acceleration sensor 16, a gyroscope sensor 18, an image sensor 20, an illuminance sensor 22, a microphone 24, a Wi-Fi interface (hereinbelow, an interface may be denoted as "I/F") 30, an NFC I/F 32, a BT I/F 34, and a controller 40.

The operation unit 12 includes a plurality of keys. A user can input various instructions to the terminal device 10 by operating the operation unit 12. The display unit 14 is a display for displaying various types of information. The display unit 14 functions as a so-called touch panel. That is, the display unit 14 functions as an operation unit as well.

The acceleration sensor 16 is a sensor configured to detect acceleration in three directions along XYZ axes. The gyroscope sensor 18 is a sensor configured to detect an angle (posture), an angular speed, and an angular acceleration, etc. of the terminal device 10. The image sensor 20 is a sensor configured to convert light obtained through a lens (not shown) of the terminal device 10 to electric signals to form an image. The illuminance sensor 22 is a sensor configured to detect brightness (illuminance intensity) of an environment surrounding the terminal device 10. The microphone 24 is an interface configured to receive sonic wave signals.

The Wi-Fi I/F 30 is an I/F configured to execute Wi-Fi communication in accordance with the Wi-Fi scheme. The Wi-Fi scheme is a wireless communication scheme based on, for example, 802.11 standard by IEEE (the Institute of Electrical and Electronics Engineers, Inc.), and standards conforming thereto (such as 802.11a, 11b, 11g, 11n, 11ac, etc.).

The NFC I/F 32 is an I/F configured to execute NFC communication in accordance with the NFC (Near Field Communication) scheme. The NFC scheme is a wireless communication scheme based on, for example, international standards such as ISO/IEC 14443, 15693, 18092 and the like. As types of I/Fs configured to execute NFC communication, an I/F called an NFC forum device and an I/F called an NFC forum tag are known. The NFC I/F 32 is an NFC forum device and is configured to operate selectively in one of a P2P (Peer To Peer) mode, an R/W (Reader/Writer) mode, and a CE (Card Emulation) mode.

Differences between the Wi-Fi I/F 30 and the NFC I/F 32 will be described. A communication speed of Wi-Fi communication executed via the Wi-Fi I/F 30 (a maximum communication speed of 600 Mbps, for example) is faster than a communication speed of NFC communication executed via the NFC I/F 32 (a maximum communication speed of 424 Kbps, for example). Further, a carrier wave frequency in Wi-Fi communication executed via the Wi-Fi I/F 30 (2.4 GHz band or 5.0 GHz band, for example) is different from a carrier wave frequency in NFC communication executed via the NFC I/F 32 (13.56 MHz band, for example). Further, a maximum distance with which Wi-Fi communication can be executed via the Wi-Fi I/F 30 (about 100 m at maximum, for example) is greater than a maximum distance with which NFC communication can be executed via the NFC I/F 32 (about 10 cm at maximum, for example).

The BT I/F 34 is an I/F configured to execute BT communication. The Bluetooth scheme is a wireless communication scheme based on, for example, 802.15.1 standard by IEEE (the Institute of Electrical and Electronics Engineers, Inc.) and standards conforming thereto. More specifically, the BT I/F 34 supports BLE (Bluetooth Low Energy).

Differences between the BT I/F 34 and the NFC I/F 32 will be described. A communication speed of BT communication executed via the BT I/F 34 (a maximum communication speed of 24 Mbps, for example) is faster than the communication speed of NFC communication executed via the NFC I/F 32 (the maximum communication speed of 424 Kbps, for example). Further, a carrier wave frequency in BT communication executed via the BT I/F 34 (2.4 GHz band, for example) is different from the carrier wave frequency in NFC communication executed via the NFC I/F 32 (13.56 MHz band, for example). Further, a maximum distance with which BT communication can be executed via the BT I/F 34 (about several ten meters at maximum, for example) is greater than the maximum distance with which NFC communication can be executed via the NFC I/F 32 (about 10 cm at maximum, for example).

The controller 40 includes a CPU 42 and a memory 44. The memory 44 is constituted of a volatile memory, a nonvolatile memory and the like. The CPU 42 is configured to execute various processes according to programs 46, 48 stored in the memory 44. An operating system (OS) program 46 is a program configured to control various basic operations of the terminal device 10, and is assumed to be an iOS (registered trademark) in this embodiment. A print scan application 48 is an application provided by a vendor of the MFP 100, and is installed in the terminal device 10 from a server on the Internet, for example. The print scan application 48 is an application configured to cause a Wi-Fi connection to be established between the terminal device 10 and the MFP 100, and cause a communication of target data (such as print data and scan data) to be executed by using the Wi-Fi connection between the terminal device 10 and the MFP 100, for example.

The memory 44 further stores a trigger setting 50 indicating a setting value that is set by the user. The trigger setting 50 indicates one of a setting value "ON" which indicates that a trigger function is enabled and a setting value "OFF" which indicates that the trigger function is disabled. The trigger function is a function related to whether or not a trigger instruction is to be supplied to the OS program 46 in response to a distance between the terminal device 10 and the MFP 100 becoming less than or equal to a threshold value (such as 1 m). The trigger instruction is supplied to the OS program 46 in a case where the trigger setting 50 indicates "ON", and the trigger instruction is not supplied to the OS program 46 in a case where the trigger setting 50 indicates "OFF".

(Configuration of MFP 100)

The MFP 100 is a peripheral device (for example, a peripheral device of the terminal device 10) configured to execute multiple functions including a print function and a scan function. The MFP 100 is allocated with a device name "DDD1", which is information for identifying the MFP 100. The MFP 100 includes an operation unit 112, a display unit 114, a print executing unit 116, a scan executing unit 118, a speaker 120, a Wi-Fi I/F 130, an NFC I/F 132, a BT I/F 134, and a controller 140.

The operation unit 112 includes a plurality of keys. The user can input various instructions to the MFP 100 by operating the operation unit 112. The display unit 114 is a display for displaying various types of information. The display unit 114 functions also as a so-called touch panel (that is, an operation unit). The print executing unit 116 is a print mechanism of an inkjet scheme or a laser scheme. The scan executing unit 118 is a scan mechanism such as a CCD and a CIS. The speaker 120 is an interface configured to send sonic wave signals including an ultrasound frequency band (20 kHz or more), and especially it is configured to send ultrasound waves. The Wi-Fi I/F 130, the NFC I/F 132, and the BT I/F 134 are same as the Wi-Fi I/F 30, the NFC I/F 32, and the BT I/F 34 of the terminal device 10, respectively. However, the Wi-Fi I/F 130 especially supports a WFD (Wi-Fi Direct (registered trademark)) scheme established by the Wi-Fi Alliance. The WFD scheme is a wireless communication scheme described in the standard "Wi-Fi Peer-to-Peer (P2P) Technical Specification Version 1.5" created by the Wi-Fi Alliance.

The controller 140 includes a CPU 142 and a memory 144. The CPU 142 is configured to execute various processes in accordance with a program 146 stored in the memory 144. The memory 144 is constituted of a volatile memory, a nonvolatile memory and the like.

Figure 2:
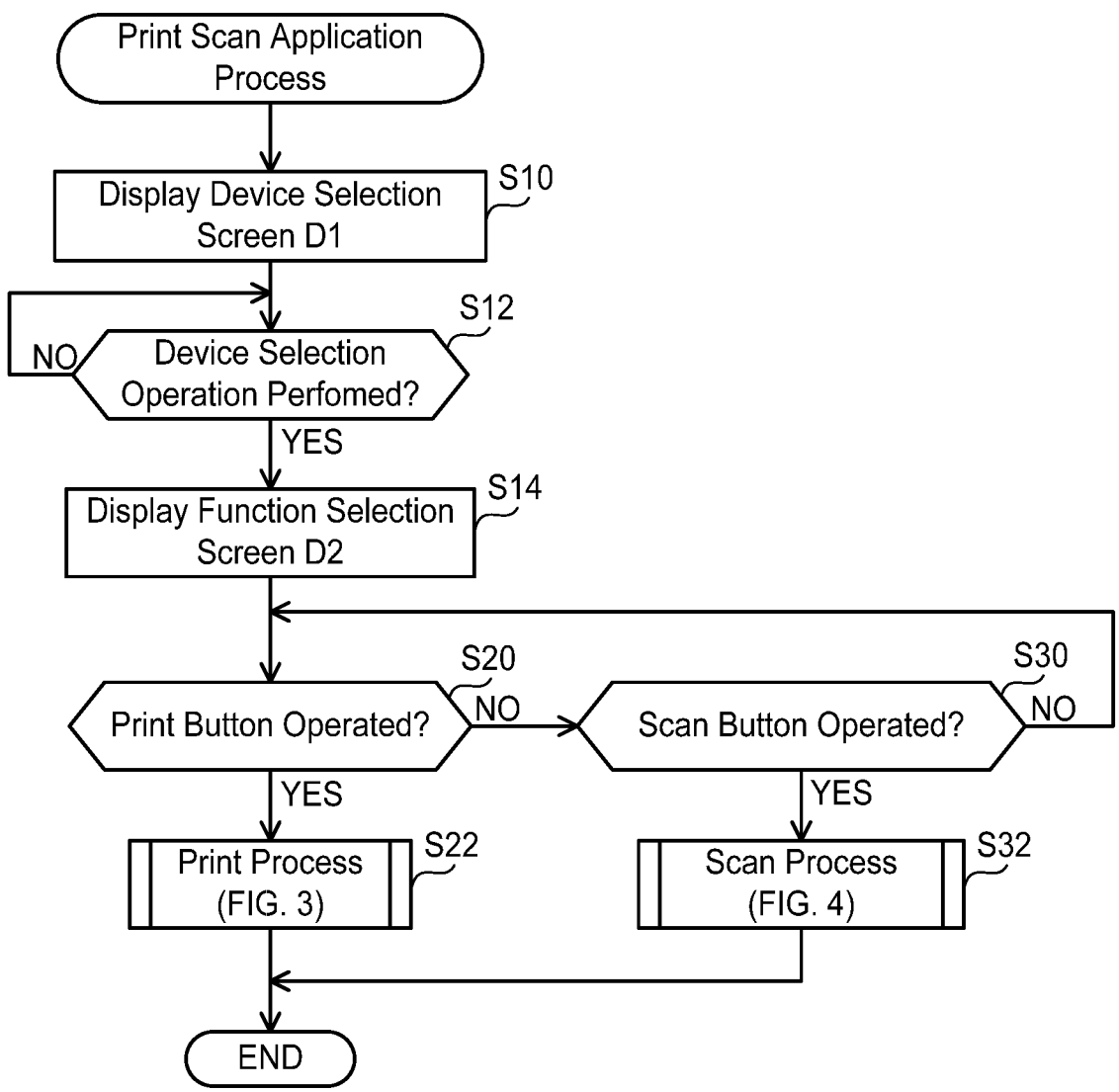
FIG. 2 shows a flowchart of a print scan application process.

(Print Scan Application Process; FIG. 2)

Next, a process which the CPU 42 of the terminal device 10 executes in accordance with the print scan application 48 will be described with reference to FIG. 2. The process of FIG. 2 is started when an operation to start the print scan application 48 is performed by the user. At a time point when the process of FIG. 2 is started, all the modes of the NFC I/F 32 of the terminal device 10 (that is, the P2P mode, the R/W mode, and the CE mode) are in a disabled state. The disabled state is a state in which NFC communication cannot be executed, and is a state, for example, in which power is not supplied to the NFC I/F 32. Hereinbelow, the CPU 42 may not be described as a subject of action for the convenience of explanation, that is, a subject of action in processes executed by the CPU 42 in accordance with the print scan application 48 and a subject of action in processes executed by the CPU 42 in accordance with the OS program 46 may be described as "application 48" and "OS 46", respectively.

Figure 5:
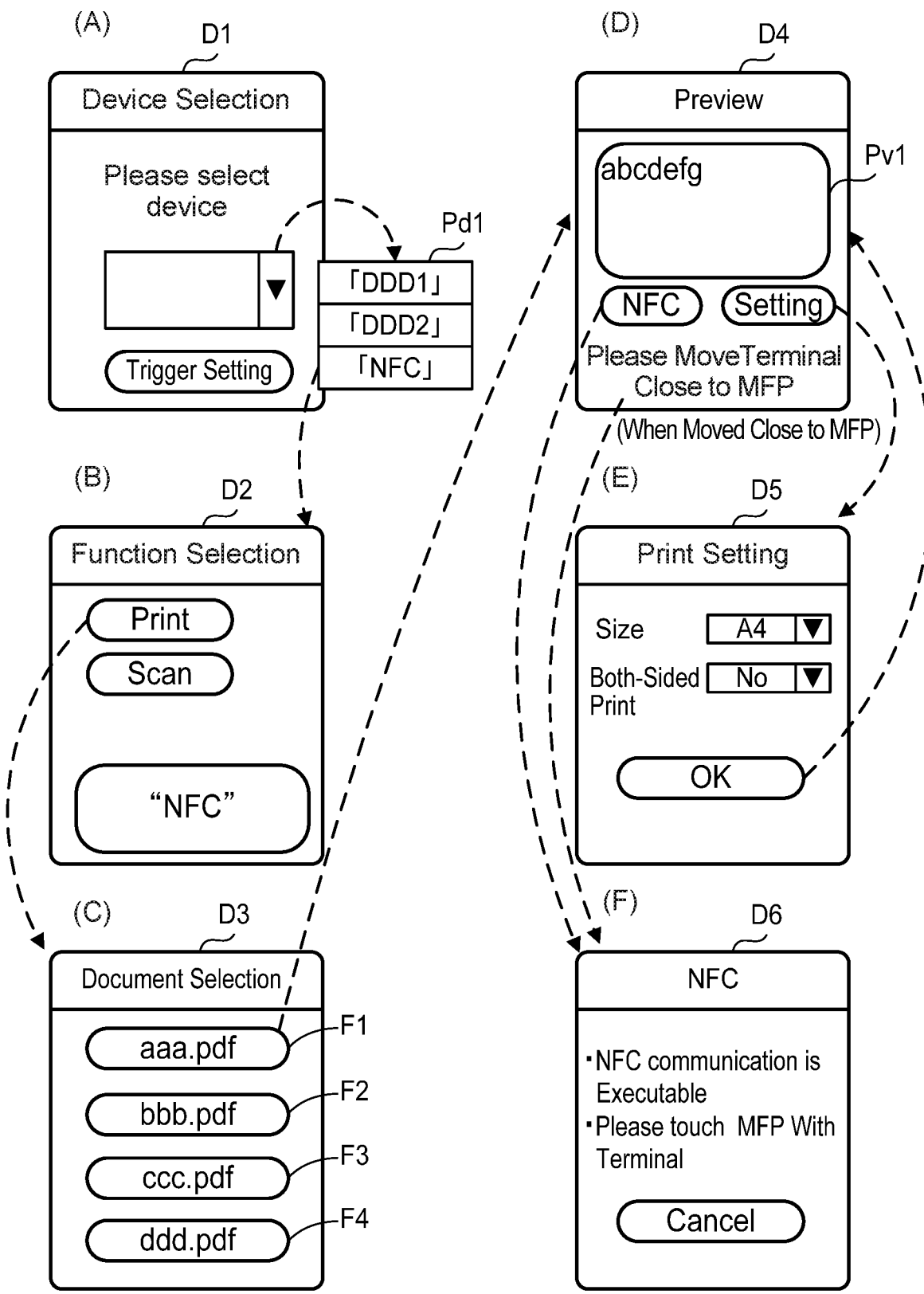
FIG. 5 shows screens for executing the print process.

In S10, the application 48 causes the display unit 14 to display a device selection screen D1. As shown in FIG. 5(A), the device selection screen D1 includes a message instructing the user to select a device that is to execute printing or scanning, a device selection box, and a trigger setting button. When a pulldown button in the device selection box is operated by the user, the application 48 causes the display unit 14 to display a pulldown menu Pd1 including a device name (such as the device name "DDD1") that is capable of establishing a Wi-Fi connection with the terminal device 10 and "NFC" for selecting an NFC device (such as the MFP 100). The user can perform a device selection operation of selecting one information from the plurality of information displayed in the pulldown menu Pd1. The trigger setting button is a button for switching the setting value of the trigger setting 50 (see FIG. 1) between "ON" and "OFF".

In S12, the application 48 monitors whether the device selection operation is performed. When the device selection operation is performed (YES in S12), the application 48 proceeds to S14. Hereinbelow, the explanation will be continued based on an example in which "NFC" is selected and the MFP 100 is the NFC device.

In S14, the application 48 causes the display unit 14 to display a function selection screen D2. As shown in FIG. 5(B), the function selection screen D2 includes two buttons corresponding to the print function and the scan function and the information "NFC" selected in S12.

Figure 6:
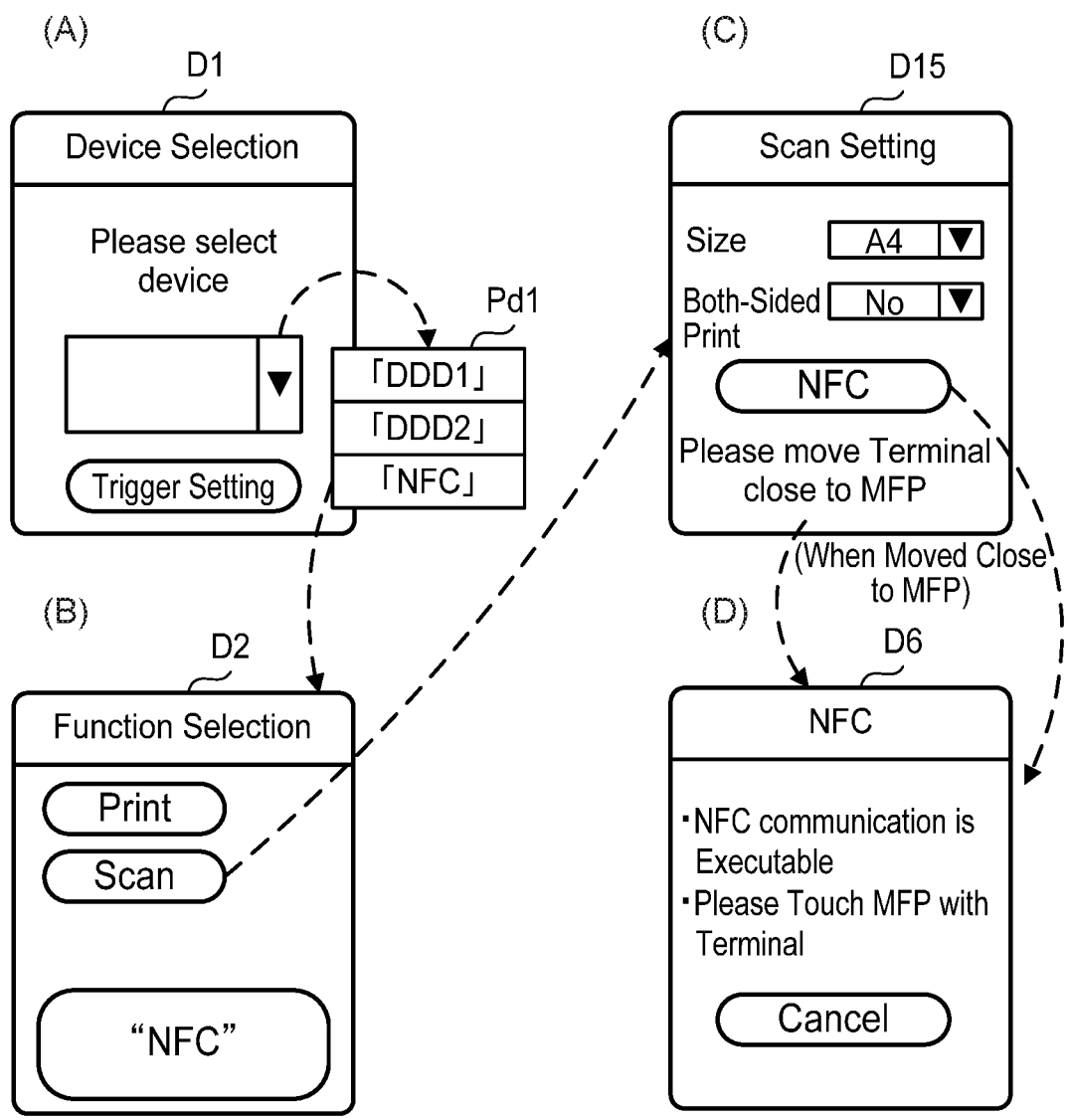
FIG. 6 shows screens for executing the scan process.

In S20 and S30, the application 48 monitors whether one of the print button and the scan button on the function selection screen D2 is selected. When the print button is selected by the user, the application 48 determines YES in S20 and executes a print process (see FIG. 3) in S22. The process of FIG. 2 is completed when S22 is completed. On the other hand, when the scan button is selected by the user, the application 48 determines YES in S30 and executes a scan process (see FIG. 4) in S32. The process of FIG. 2 is completed when S32 is completed. FIGS. 6(A) and (B) show the respective screens displayed until the scan button has been selected.

Figure 3:
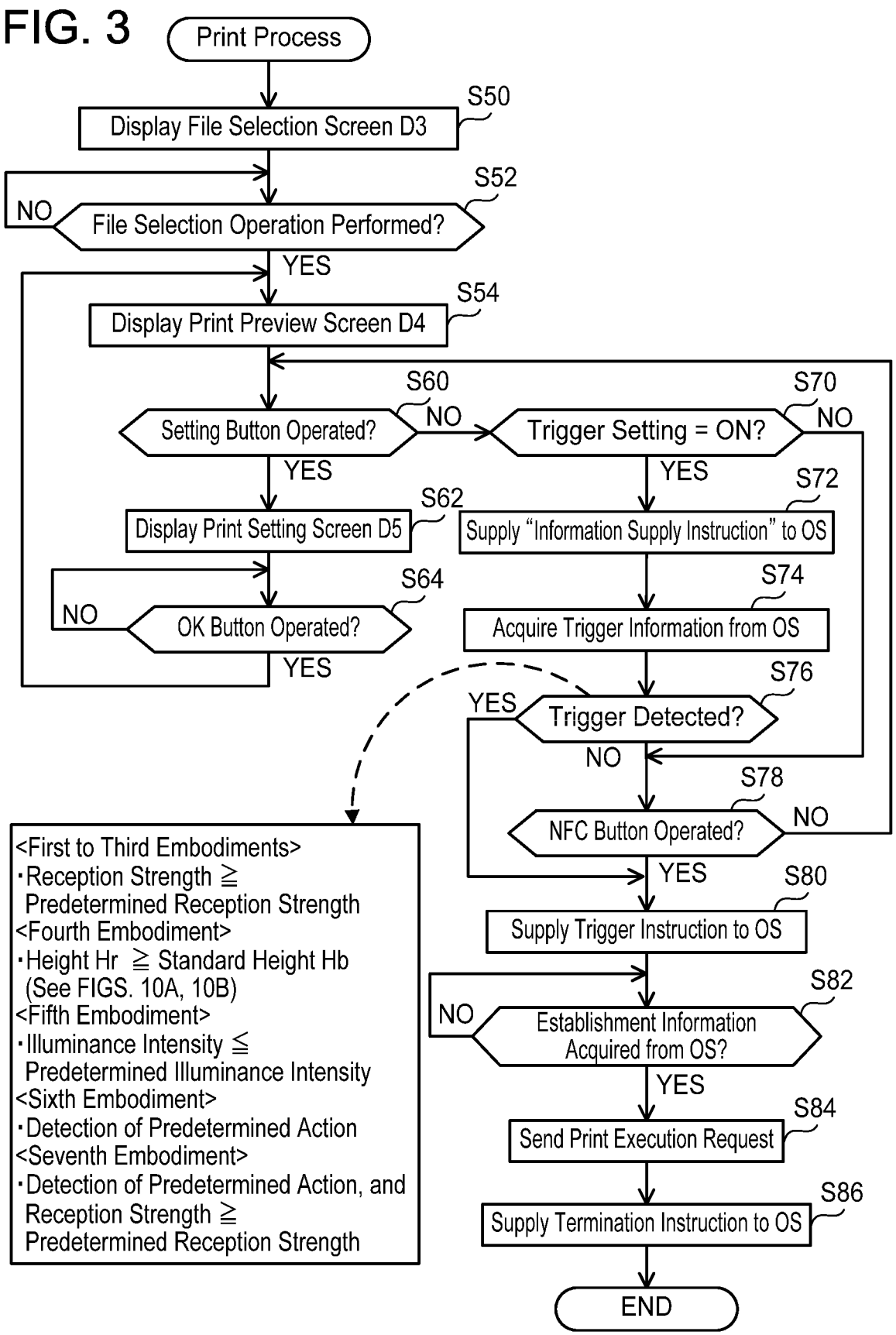
FIG. 3 shows a flowchart of a print process.

(Print Process; FIG. 3)

Next, contents of the print process executed in S22 of FIG. 2 will be described with reference to FIG. 3. In S50, the application 48 causes the display unit 14 to display a file selection screen D3. As shown in FIG. 5(C), the file selection screen D3 includes a plurality of file selection buttons F1 to F4 respectively indicating plural file names of plural files stored in the memory 44.

In S52, the application 48 monitors whether a file selection operation is performed. The file selection operation is an operation of selecting one file selection button from the plurality of file selection buttons F1 to F4 on the file selection screen D3. When the file selection operation is performed, the application 48 determines YES in S52 and proceeds to S54. Hereinbelow, the explanation will be continued based on an example in which the file selection button F1 is selected.

In S54, the application 48 causes the display unit 14 to display a print preview screen D4. As shown in FIG. 5(D), the print preview screen D4 includes a print preview image Pv1 represented by the file selected in S52, an NFC button, a setting button, and a message prompting the user to approach the MFP 100.

The print preview image Pv1 is an image conforming to a default print setting that is preset in the application 48. By seeing the print preview image Pv1, the user can understand how an image will be printed. The NFC button is a button for changing the R/W mode of the NFC I/F 32 from the disabled state (that is, OFF) to an enabled state (that is, ON). The setting button is a button for executing print setting. Although details will be described later, in the present embodiment, the R/W mode of the NFC I/F 32 is automatically changed from the disabled state to the enabled state when the distance between the terminal device 10 and the MFP 100 becomes less than or equal to the threshold value (such as 1 m) even if the NFC button is not selected by the user. In order to realize this, the aforementioned message prompting the user to approach the MFP 100 is displayed on the print preview screen D4.

In S60, the application 48 monitors whether the setting button in the print preview screen D4 is operated. When the setting button is selected, the application 48 determines YES in S60 and proceeds to S62.

In S62, the application 48 causes the display unit 14 to display a print setting screen D5. As shown in FIG. 5(E), the print setting screen D5 includes a size setting box for setting a size of print paper, a both-sided print setting box for setting whether or not to cause the MFP 100 to execute both-sided printing, and an OK button. The user can change print setting on the print setting screen D5.

In S64, the application 48 monitors whether the OK button in the print setting screen D5 is selected. When the OK button is selected, the application 48 determines YES in S64 and causes the display unit 14 to display the print preview screen D4 again in S54. Here, the application 48 causes the display unit 14 to display the print preview screen D4 that includes the print preview image Pv1 conforming to the print setting indicating the size of print paper and the selection of yes/no for the both-sided printing that were displayed on the print setting screen D5 when the OK button was selected.

Further, in parallel to the monitoring of S60, the application 48 determines whether or not the trigger setting 50 is "ON" in S70. The application 48 proceeds to S72 in a case where the trigger setting 50 is "ON" (YES in S70), and proceeds to S78 in a case where the trigger setting 50 is "OFF" (NO in S70).

In S72, the application 48 supplies an information supply instruction to the OS 46. The information supply instruction is an instruction for requesting the OS 46 to supply trigger information. The trigger information is a signal indicating a reception strength of a radio wave signal received by the Wi-Fi I/F 30.

In the present embodiment, the MFP 100 operates as a Group Owner (hereinbelow termed "G/O") of the WFD scheme, and periodically sends a radio wave signal, which is a beacon signal for searching nearby child devices, via the Wi-Fi I/F 130. Due to this, the Wi-Fi I/F 30 of the terminal device 10 can receive a radio wave signal from the MFP 100. When acquiring the information supply instruction from the application 48, the OS 46 supplies the application 48 with the trigger information which is a signal indicating the reception strength of the radio wave signal received by the Wi-Fi I/F 30.

The application 48 acquires in S74 the trigger information from the Wi-Fi I/F 30 via the OS 46 and determines in S76 whether or not a trigger for supplying the trigger instruction to the OS 46 is detected by using the trigger information. Specifically, the application 48 specifies the reception strength indicated by the trigger information and determines whether or not the specified reception strength is equal to or greater than a predetermined reception strength. The application 48 proceeds to S80 in a case of determining that the specified reception strength is greater than or equal to the predetermined reception strength (YES in S76), that is, in a case of determining that the distance between the terminal device 10 and the MFP 100 is less than or equal to the threshold value (such as 1 m). On the other hand, the application 48 proceeds to S78 in a case of determining that the specified reception strength is less than the predetermined reception strength (NO in S76), that is, in a case of determining that the distance between the terminal device 10 and the MFP 100 is greater than the threshold value. The above threshold value is set to a value that is greater than the maximum distance with which NFC communication can be executed.

In S78, the application 48 determines whether or not the NFC button in the print preview screen D4 has been operated. The application 48 proceeds to S80 in a case where the NFC button has been operated (YES in S78), and it returns to S60 in a case where the NFC button has not been operated (NO in S78).

In S80, the application 48 supplies the trigger instruction to the OS 46. The trigger instruction is an instruction for requesting the OS 46 to execute the following (1) and (2): (1) display an NFC screen D6 (see FIG. 5(F)) and (2) supply the NFC I/F 32 with an R/W mode ON instruction for changing the R/W mode from the disabled state to the enabled state. When acquiring the trigger instruction from the application 48, the OS 46 causes the display unit 14 to display the NFC screen D6. As shown in FIG. 5(F), the NFC screen D6 includes a message for notifying the user that NFC communication is executable, a message for prompting the user to touch the MFP 100 with the terminal device 10,
and a cancel button. Further, the OS 46 supplies the NFC I/F 32 with the R/W mode ON instruction for changing the R/W mode of the NFC I/F 32 to the enabled state. As a result, the R/W mode of the NFC I/F 32 changes from the disabled state to the enabled state. Here, the enabled state of the R/W mode is a state in which NFC communication according to the R/W mode is executable, and is a state, for example, in which power is supplied to the NFC I/F 32.

When the distance between the terminal device 10 and the MFP 100 becomes shorter than the maximum distance (such as 10 cm) with which NFC communication is executable after the trigger instruction has been supplied to the OS 46, an NFC connection is established between the terminal device 10 and the MFP 100. In this case, the NFC I/F 32 operates in the Reader mode of the R/W mode to read (that is, to receive) wireless setting information from the MFP 100. Then, the OS 46 acquires the wireless setting information from the NFC I/F 32. The wireless setting information is information for establishing a Wi-Fi connection with the MFP 100 operating as the G/O of the WFD scheme, and includes an SSID (Service Set Identifier) and a password of a wireless network formed by the MFP 100. Then, the OS 46 supplies a connection instruction including the wireless setting information to the Wi-Fi I/F 30. Due to this, the Wi-Fi I/F 30 uses the wireless setting information to establish a Wi-Fi connection with the MFP 100, and the terminal device 10 participates in the wireless network in which the MFP 100 operates as the G/O as a child device. In this case, the OS 46 acquires establishment information indicating that the Wi-Fi connection has been established from the Wi-Fi I/F 30, and supplies the establishment information to the application 48.

In S82, the application 48 monitors whether the establishment information is acquired from the OS 46. When acquiring the establishment information from the OS 46 (YES in S82), the application 48 converts the file selected in S52 to generate print data having a data format which is interpretable by the MFP 100 and sends a print execution request including this print data and print setting to the MFP 100 via the Wi-Fi I/F 30 (that is, by using the Wi-Fi connection) in S84. As above, the application 48 sends the print execution request to the MFP 100 by using Wi-Fi communication having the faster communication speed than NFC communication, and thus the print execution request can be sent to the MFP 100 promptly.

In S86, the application 48 supplies a termination instruction to the OS 46. The termination instruction is an instruction for requesting the OS 46 to execute the following (1) and (2): (1) stop displaying the NFC screen D6 and (2) supply the NFC I/F 32 with an R/W mode OFF instruction for changing the R/W mode from the enabled state to the disabled state. When acquiring the termination instruction from the application 48, the OS 46 stops displaying the NFC screen D6, and supplies the R/W mode OFF instruction to the NFC I/F 32. When S86 is completed, the process of FIG. 3 is completed.

As above, the application 48 supplies the trigger instruction to the OS 46 (S80) when the distance between the terminal device 10 and the MFP 100 becomes less than or equal to the threshold value, only in a case where the print preview screen D4 (see FIG. 5(D)) is displayed on the display unit 14. That is, the application 48 is configured not to supply the trigger instruction to the OS 46 even if the distance between the terminal device 10 and the MFP 100 becomes less than or equal to the threshold value in cases where the screens other than the print preview screen D4 (the screens D1 to D3, and D5) are displayed. As such, the NFC screen D6 can be suppressed from being displayed instead of the screens D1 to D3, and D5 in situations where the user should perform operations on the screens D1 to D3, and D5. Due to this, the user can suitably perform the operations on the screens D1 to D3, and D5.

Figure 4:
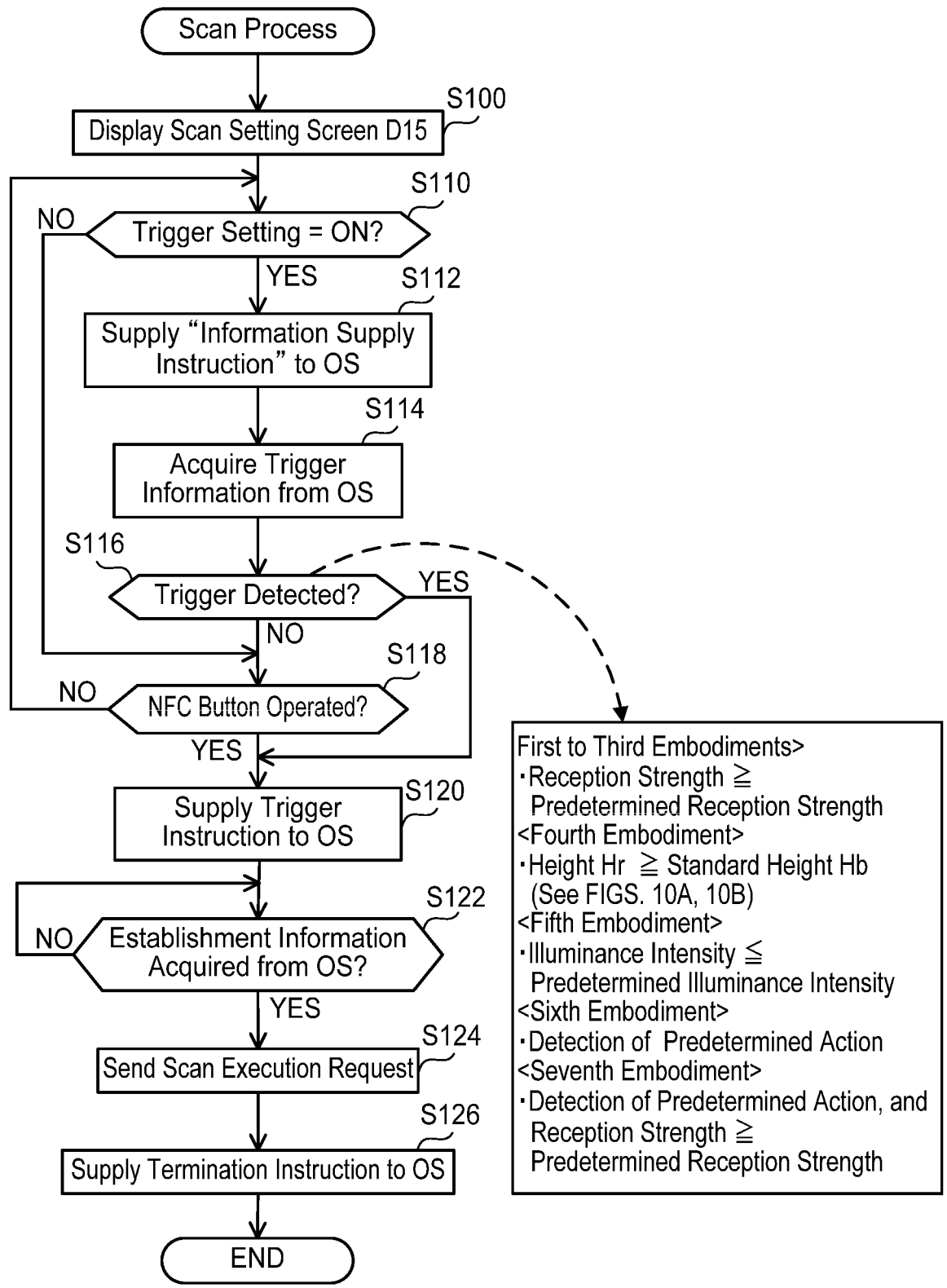
FIG. 4 shows a flowchart of a scan process.

(Scan Process; FIG. 4)

Next, contents of the scan process executed in S32 of FIG. 2 will be described with reference to FIG. 4. In S100, the application 48 causes the display unit 14 to display a scan setting screen D15. As shown in FIG. 6(C), the scan setting screen D15 includes a size setting box for selecting a size of a document which the MFP 100 is to scan, a both-sided scan setting box for selecting whether or not to execute both-sided scanning on the document, an NFC button, and a message prompting the user to approach the MFP 100.

S110 to S122 are same as S70 to S82 of FIG. 3. That is, the trigger instruction is supplied to the OS 46 when the distance between the terminal device 10 and the MFP 100 becomes less than or equal to the threshold value only in a case where the scan setting screen D15 is displayed on the display unit 14.

When the application 48 acquires the establishment information from the OS 46 (YES in S122), it sends a scan execution request including a scan setting to the MFP 100 via the Wi-Fi I/F 30 in S124. As a result, scanning of the document in accordance with the scan setting is executed by the MFP 100, and scan data is thereby generated. Further, the application 48 receives the scan data from the MFP 100 via the Wi-Fi I/F 30. S126 is same as S86 of FIG. 3. When S126 is completed, the process of FIG. 4 is completed.

(Specific Cases)

Figure 7:
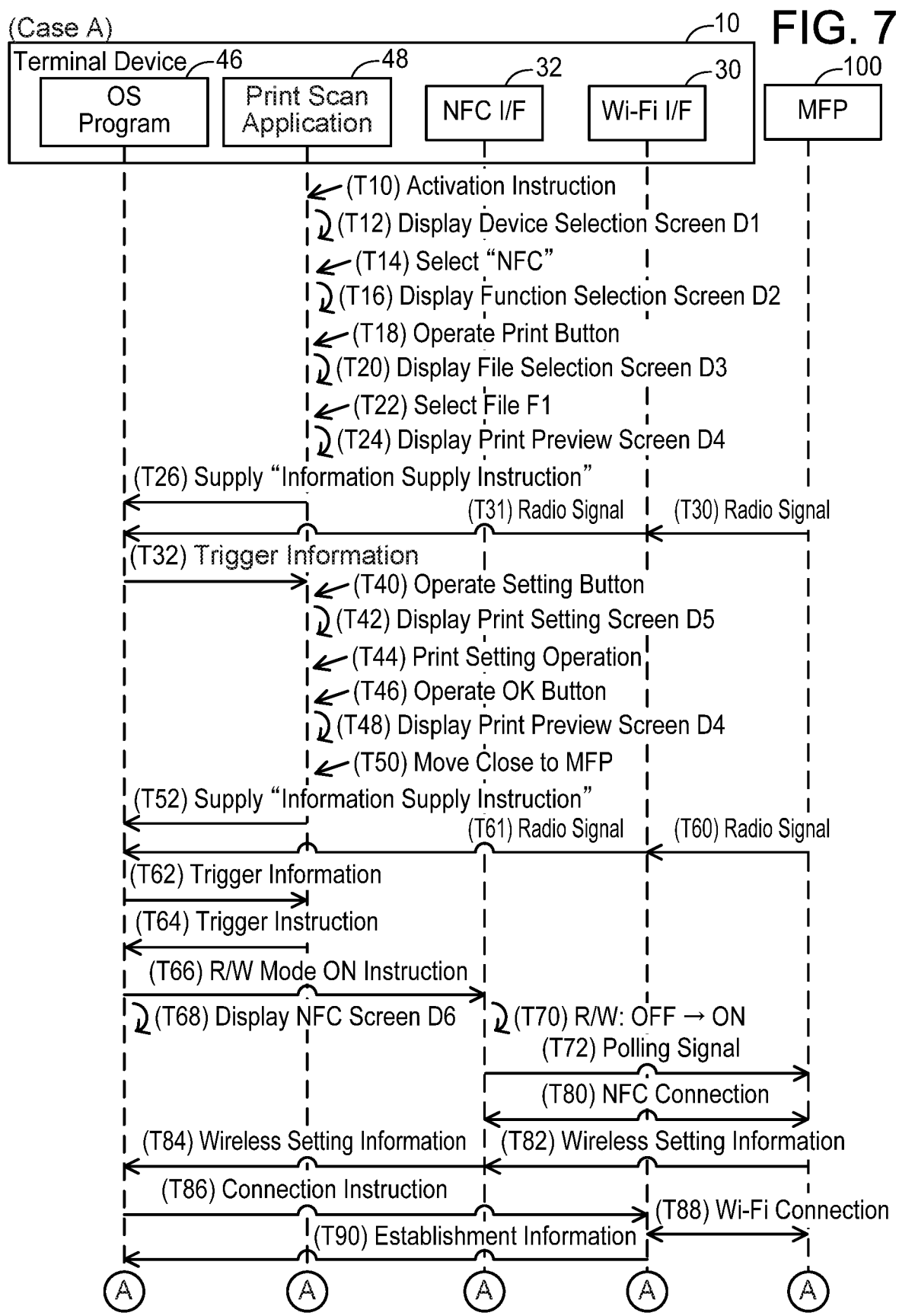
FIG. 7 shows a sequence diagram of Case A in which printing using an NFC communication is executed.

Next, specific cases realized by the processes of FIGS. 2 to 4 will be described with reference to FIGS. 7 to 9. In an initial state of each case, the MFP 100 is operating as the G/O of the WFD scheme and stores the wireless setting information. Further, all of the P2P mode, the R/W mode, and the CE mode of the NFC I/F 32 of the terminal device 10 are in the disabled state. Further, the trigger setting 50 is set to "ON".

(Case A; FIG. 7)

Case A is a case in which the MFP 100 is caused to execute printing. In T10, the operation to start the application 48 is performed by the user. In this case, in T12, the application 48 displays the device selection screen D1 (see FIG. 5(A)) (S10 of FIG. 2).

When the application 48 accepts the device selection operation of selecting "NFC" (YES in S12) in T14, it displays the function selection screen D2 (see FIG. 5(B)) in T16 (S14). Next, when the application 48 accepts a selection of the print button in T18 (YES in S20), it displays the file selection screen D3 (see FIG. 5(C)) in T20 (S50 of FIG. 3).

When the application 48 accepts a selection of the file selection button F1 (YES in S52) in T22, it displays the print preview screen D4 (see FIG. 5(D)) in T24 (S54). At this time point, the application 48 determines that the setting button is not operated (NO in S60) and determines that the trigger setting 50 is "ON" (YES in S70), as a result of which it supplies the information supply instruction to the OS 46 (S72) in T26.

The Wi-Fi I/F 30 receives a radio wave signal from the MFP 100 in T30 and supplies the radio wave signal to the OS 46 in T31. When the OS 46 acquires the information supply instruction from the application 48 in T26 and acquires the radio wave signal from the Wi-Fi I/F 30 in T31, it supplies the trigger information, which is the signal indicating the reception strength of the radio wave signal, to the application 48 in T32. The MFP 100 periodically sends a radio wave signal. That is, the Wi-Fi I/F 30 periodically receives a radio wave signal from the MFP 100, and each time the Wi-Fi I/F 30 receives a radio wave signal from the MFP 100, it supplies this radio wave signal to the OS 46. However, the OS 46 does not supply the trigger information to the application 48 even if receiving a radio wave signal from the Wi-Fi I/F 30, in a case where it does not acquire the information supply instruction from the application 48.

When the application 48 acquires the trigger information from the Wi-Fi I/F 30 via the OS 46 in T32 (S74), it specifies the reception strength indicated by the trigger information and determines that the specified reception strength is less than the predetermined reception strength (NO in S76). That is, the application 48 determines that the distance between the terminal device 10 and the MFP 100 is greater than the threshold value, and does not supply the trigger instruction to the OS 46.

After this, when the application 48 accepts a selection of the setting button in T40 (YES in S60), it displays the print setting screen D5 (see FIG. 5(E)) in T42 (S62). When the application 48 accepts the print setting operation in T44 and accepts the operation on the OK button in T46 (YES in S64), it displays the print preview screen D4 (see FIG. 5(D)) again in T48 (S54).

After this, in T50, the user approaches the MFP 100 in a state of holding the terminal device 10. By doing so, the reception strength of a radio wave signal received by the Wi-Fi I/F 30 increases. T52 to T62 are same as T26 to T32, respectively. In this case, the application 48 determines that the reception strength indicated by the trigger information acquired in T62 is greater than or equal to the predetermined reception strength (YES in S76). That is, the application 48 determines that the distance between the terminal device 10 and the MFP 100 is less than or equal to the threshold value, and supplies the trigger information to the OS 46 in T64 (S80). The MFP 100 periodically sends a radio wave signal.

When the OS 46 acquires the trigger information from the application 48 in T64, it supplies the R/W mode ON instruction to the NFC I/F 32 in T66. Further, the OS 46 displays the NFC screen D6 (see FIG. 5(F)) in T68. When the NFC I/F 32 acquires the R/W mode ON instruction from the OS 46 in T66, it changes the R/W mode from the disabled state to the enabled state in T70 and starts sending a polling signal in T72. When the polling signal is received by the MFP 100, an NFC connection is established between the terminal device 10 and the MFP 100 in T80. In this case, the NFC I/F 32 uses the NFC connection to receive the wireless setting information from the MFP 100 in T82, and supplies the wireless setting information to the OS 46 in T84.

When the OS 46 acquires the wireless setting information from the NFC I/F 32 in T84, it supplies the connection instruction including the wireless setting information to the Wi-Fi I/F 30 in T86. In this case, the Wi-Fi I/F 30 establishes a Wi-Fi connection with the Wi-Fi I/F 130 of the MFP 100 in T88, and supplies the establishment information to the OS 46 in T90.

Figure 8:
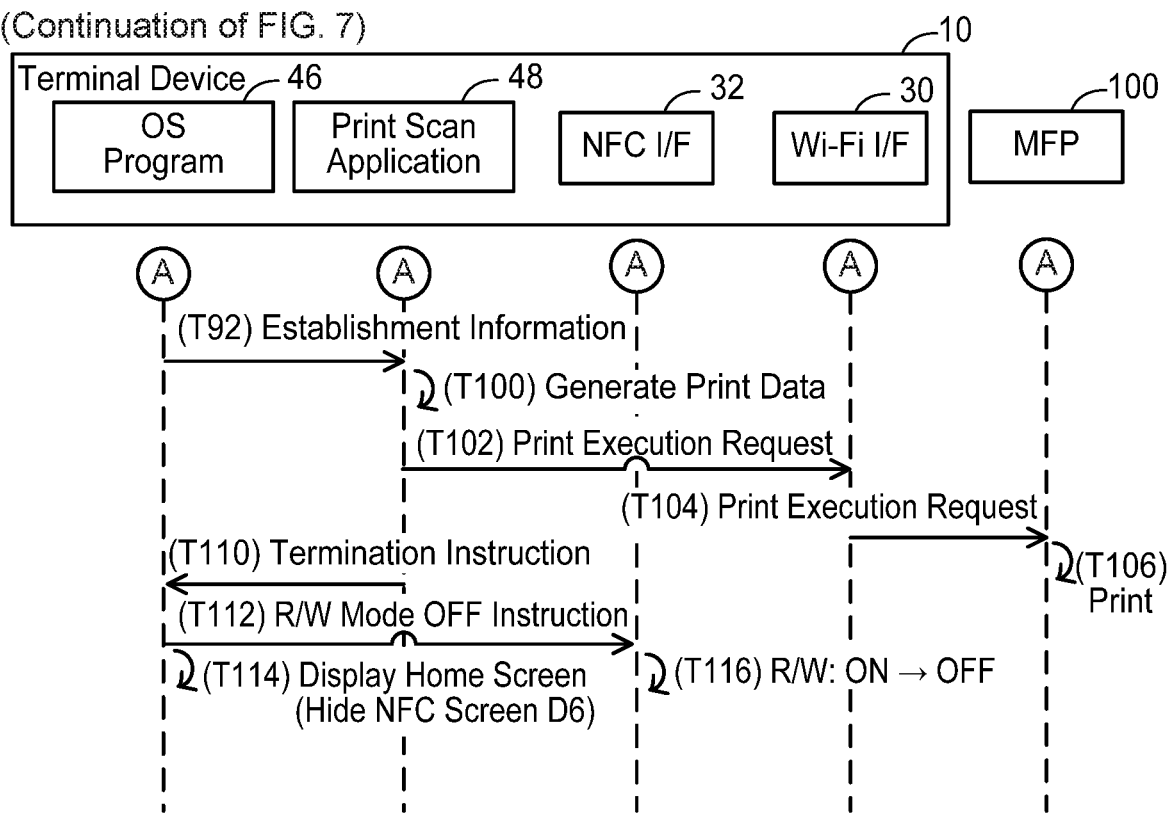
FIG. 8 shows a sequence diagram continued from FIG. 7.
Figure 9:
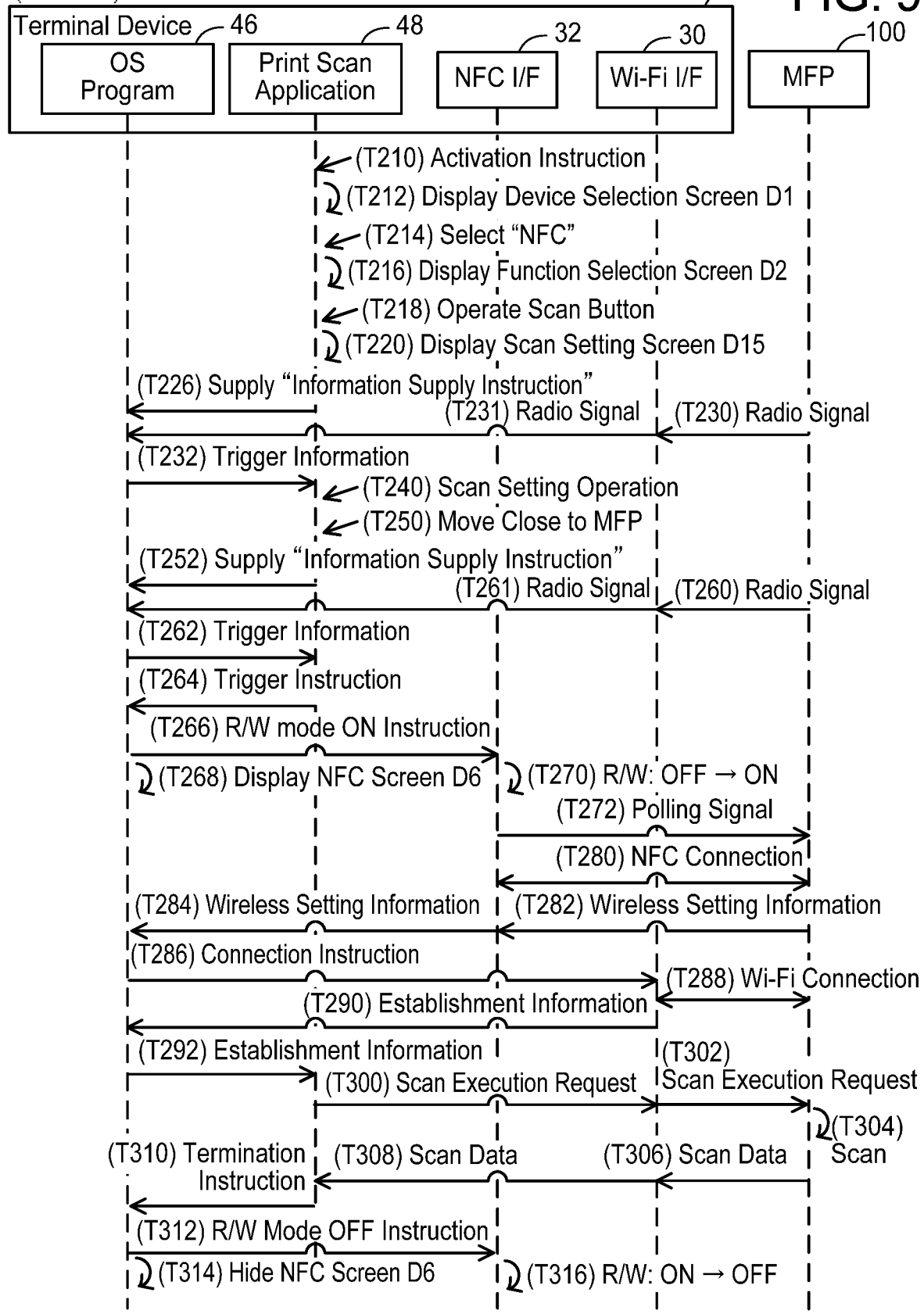
FIG. 9 shows a sequence diagram of Case B in which scanning using an NFC communication is executed.

The application 48 acquires the establishment information from the OS 46 in T92 of FIG. 8 (YES in S82). In this case, the application 48 generates print data in T100, and supplies the Wi-Fi I/F 30 with the print execution request including the print data and print setting in T102. As a result, the Wi-Fi I/F 30 sends the print execution request to the MFP 100 in T104.

When the MFP 100 receives the print execution request from the terminal device 10 in T104, it supplies the print data and the print setting in the print execution request to the print executing unit 116 in T106 to cause the print executing unit 116 to execute printing of an image represented by this print data.

The application 48 supplies the termination instruction to the OS 46 in T110 (S86). In this case, the OS 46 supplies the R/W mode OFF instruction to the NFC I/F 32 in T112. Further, the OS 46 stops displaying the NFC screen D6 in T114, and displays a home screen (not shown), for example. When the NFC I/F 32 acquires the R/W mode OFF instruction from the OS 46 in T112, it changes the R/W mode from the enabled state to the disabled state in T116, and stops sending a polling signal. As above, the R/W mode of the NFC I/F 32 is set to the enabled state only in the case where the NFC screen D6 is displayed. In other words, the NFC I/F 32 is configured to be capable of executing NFC communication only in the case where the NFC screen D6 is displayed.

(Effects of Case A)

The application 48 of the terminal device 10 supplies the trigger instruction to the OS 46 (T64 of FIG. 7) in the case of determining that the distance between the terminal device 10 and the MFP 100 is less than or equal to the threshold value by using the trigger information acquired from the OS 46, even if the NFC button on the print preview screen D4 (see FIG. 5(D)) is not selected. When the OS 46 acquires the trigger instruction, it displays the NFC screen D6 (see FIG. 5(F)) (T68) and supplies the R/W mode ON instruction to the NFC I/F 32 (T66). When the NFC I/F 32 acquires the R/W mode ON instruction, it changes the R/W mode from the disabled state to the enabled state (T70). Due to this, the terminal device 10 can execute NFC communication with the MFP 100 (T80, T82). Without having to select the NFC button on the print preview screen D4, the user can easily cause the terminal device 10 to execute NFC communication with the MFP 100 simply by bringing the terminal device 10 close to the MFP 100. As a result, the user can easily cause the MFP 100 to execute the print function.

(Case B; FIG. 9)

Next, Case B will be described with reference to FIG. 9. Case B is a case in which the MFP 100 is caused to execute scanning T210 to T216 are same as T10 to T16 of FIG. 7. When the application 48 accepts the operation on the scan button in T218 (YES in S30 of FIG. 2), it displays the scan setting screen D15 (see FIG. 6(C)) in T220 (S100 of FIG. 4). In this case, the application 48 determines that the trigger setting 50 is "ON" (YES in S110), and supplies the information supply instruction to the OS 46 in T226 (S112). T230 to T232 are same as T30 to T32 of FIG. 7.

When the application 48 acquires the trigger information from the OS 46 in T232 (S114), it specifies the reception strength indicated by the trigger information and determines that the specified reception strength is less than the predetermined reception strength (NO in S116). That is, the application 48 determines that the distance between the terminal device 10 and the MFP 100 is greater than the threshold value and does not supply the trigger instruction to the OS 46.

After this, the application 48 accepts a scan setting operation in T240. Then, when the terminal device 10 is brought close to the MFP 100 in T250, the reception strength of a radio wave signal received by the Wi-Fi I/F 30 increases. T252 to T262 are same as T52 to T62. In this case, the application 48 determines that the reception strength of the radio wave signal indicated by the trigger information acquired in T262 is greater than or equal to the predetermined reception strength (YES in S116). That is, the application 48 determines that the distance between the terminal device 10 and the MFP 100 is less than or equal to the threshold value and supplies the trigger instruction to the OS 46 in T264 (S120). T266 to T290 are same as T66 to T90.

When the application 48 acquires the establishment information from the OS 46 in T292 (YES in S122), it supplies the scan execution request including the scan setting to the Wi-Fi I/F 30 in T300. As a result, the Wi-Fi I/F 30 sends the scan execution request to the MFP 100 in T302 (S124).

When the MFP 100 receives the scan execution request from the terminal device 10, it causes the scan executing unit 118 to execute scanning of a document set in the MFP 100 in T304 in accordance with the scan setting in the scan execution request, and sends scan data to the terminal device 10 in T306.

The application 48 receives the scan data from the MFP 100 via the Wi-Fi I/F 30 in T308. T310 to T316 are same as T110 to T116 of FIG. 8.

(Effects of Case B)

The application 48 of the terminal device 10 supplies the trigger instruction to the OS 46 (T264) in the case of determining that the distance between the terminal device 10 and the MFP 100 is less than or equal to the threshold value by using the trigger information acquired from the OS 46, even if the NFC button on the scan setting screen D15 (see FIG. 6C) is not selected. When the OS 46 acquires the trigger instruction, it displays the NFC screen D6 (see FIG. 6(D)) (T268) and supplies the R/W mode ON instruction to the NFC I/F 32 (T266). When the NFC I/F 32 acquires the R/W mode ON instruction, it changes the R/W mode from the disabled state to the enabled state (T270). Due to this, the terminal device 10 can execute NFC communication with the MFP 100 (T280, T282). Without having to select the NFC button on the scan setting screen D15, the user can easily cause the terminal device 10 to execute NFC communication with the MFP 100 simply by bringing the terminal device 10 close to the MFP 100. As a result, the user can easily cause the MFP 100 to execute the scan function.

(Corresponding Relationships)

The terminal device 10 and the MFP 100 are respectively examples of "terminal device" and "communication device". The display unit 14 and the NFC I/F 32 are respectively examples of "display unit" and "first wireless interface". The Wi-Fi I/F 30 is an example of "hardware", "second wireless interface", and "third wireless interface". The R/W mode is an example of "mode related to the wireless communication via the first wireless interface". The trigger information in T31, T32, T61, T62 of FIG. 7 and T231, T232, T261, T262 of FIG. 9 is an example of "first signal". The radio wave signal in T30, T60 of FIG. 7 and T230, T260 of FIG. 9 is an example of "second signal". The NFC button in the print preview screen D4 of FIG. 5D and the NFC button in the scan setting screen D15 of FIG. 6(C) are examples of "button that may be displayed on the display unit for supplying the trigger instruction to the OS program". The NFC screen D6 is an example of "notification screen". The R/W mode ON instruction is an example of "change instruction". The print execution request, the print data, the scan execution request, and the scan data are examples of "target data". The trigger setting 50 is an example of "setting value".

S74 of FIG. 3 and S114 of FIG. 4 are examples of "acquiring the first signal from the hardware". S76 of FIG. 3 and S116 of FIG. 4 are examples of "determining, by using the first signal, whether the distance between the terminal device and the communication device is less than or equal to a threshold value". S80 of FIGS. 3 and S120 of FIG. 4 are examples of "supplying a trigger instruction to the OS program even if a button that may be displayed on the display unit for supplying the trigger instruction to the OS program is not selected".

Second to Sixth Embodiments

Next, second to sixth embodiments will be described. These embodiments differ from the first embodiment regarding processes executed from S72 to S76 of FIG. 3 and from S112 to S116 of FIG. 4. Since S112 to S116 of FIG. 4 are same as S72 to S76 of FIG. 3, the explanation will be given primarily for S72 to S76 of FIG. 3.

Second Embodiment

In the second embodiment, the application 48 uses a reception strength of a radio wave signal received by the BT I/F 34 to detect that the distance between the terminal device 10 and the MFP 100 is less than or equal to the threshold value (such as 1 m).

The BT I/F 134 of the MFP 100 periodically sends a radio wave signal, such as an Advertise signal or a ScanRequest signal. Due to this, the BT I/F 34 of the terminal device 10 receives the radio wave signal sent from the BT I/F 134 of the MFP 100 and can supply this radio wave signal to the OS 46.

The application 48 supplies the information supply instruction to the OS 46 in S72 of FIG. 3. When the OS 46 acquires the information supply instruction from the application 48, it acquires the radio wave signal received by the BT I/F 34 and supplies the application 48 with trigger information indicating the reception strength of this radio wave signal.

When the application 48 acquires the trigger information from the BT I/F 34 via the OS 46 in S74, it specifies the reception strength indicated by the trigger information and determines whether or not the specified reception strength is greater than or equal to a predetermined reception strength in S76. In a case where the specified reception strength is greater than or equal to the predetermined reception strength (YES in S76), the application 48 determines that the distance between the terminal device 10 and the MFP 100 is less than or equal to the threshold value and proceeds to S80. On the other hand, in a case where the specified reception strength is less than the predetermined reception strength (NO in S76), the application 48 determines that the distance between the terminal device 10 and the MFP 100 is greater than the threshold value and proceeds to S78. In this embodiment as well, the user can easily cause the terminal device 10 to execute NFC communication with the MFP 100. In this embodiment, the BT I/F 34 is an example of "hardware" and "second wireless interface", and the radio wave signal sent from the BT I/F 134 of the MFP 100 is an example of "second signal".

Third Embodiment

In the third embodiment, the application 48 uses a reception strength of an ultrasound wave received by the microphone 24 to detect that the distance between the terminal device 10 and the MFP 100 is less than or equal to the threshold value (such as 1 m).

The speaker 120 of the MFP 100 periodically sends an ultrasonic wave signal. Due to this, the microphone 24 of the terminal device 10 receives the ultrasonic wave signal sent from the speaker 120 of the MFP 100 and can supply this radio wave signal to the OS 46. Since the ultrasonic wave signal which the user cannot sense is used instead of a sonic wave signal which the user can sense, unpleasantness to the user caused by sound outputted from the MFP 100 can be suppressed. However, in a variant, the sonic wave signal may be used instead of the ultrasonic wave signal.

The application 48 supplies the information supply instruction to the OS 46 in S72 of FIG. 3. When the OS 46 acquires the information supply instruction from the application 48, it acquires the ultrasonic wave signal received by the microphone 24 and supplies trigger information indicating the reception strength of this ultrasonic wave signal to the application 48.

The application 48 acquires the trigger information from the microphone 24 via the OS 46 in S74, specifies the reception strength indicated by the trigger information, and determines whether or not the specified reception strength is greater than or equal to a predetermined reception strength in S76. Processes that follow thereafter are same as those of the first and second embodiments. In this embodiment as well, the user can easily cause the terminal device 10 to execute NFC communication with the MFP 100. In this embodiment, the microphone 24 is an example of "hardware" and "second wireless interface", and the ultrasonic wave signal sent from the speaker 120 of the MFP 100 is an example of "second signal".

Fourth Embodiment

In the fourth embodiment, the application 48 uses an image acquired from the image sensor 20 to detect that the distance between the terminal device 10 and the MFP 100 is less than or equal to the threshold value.

Figure 10A:
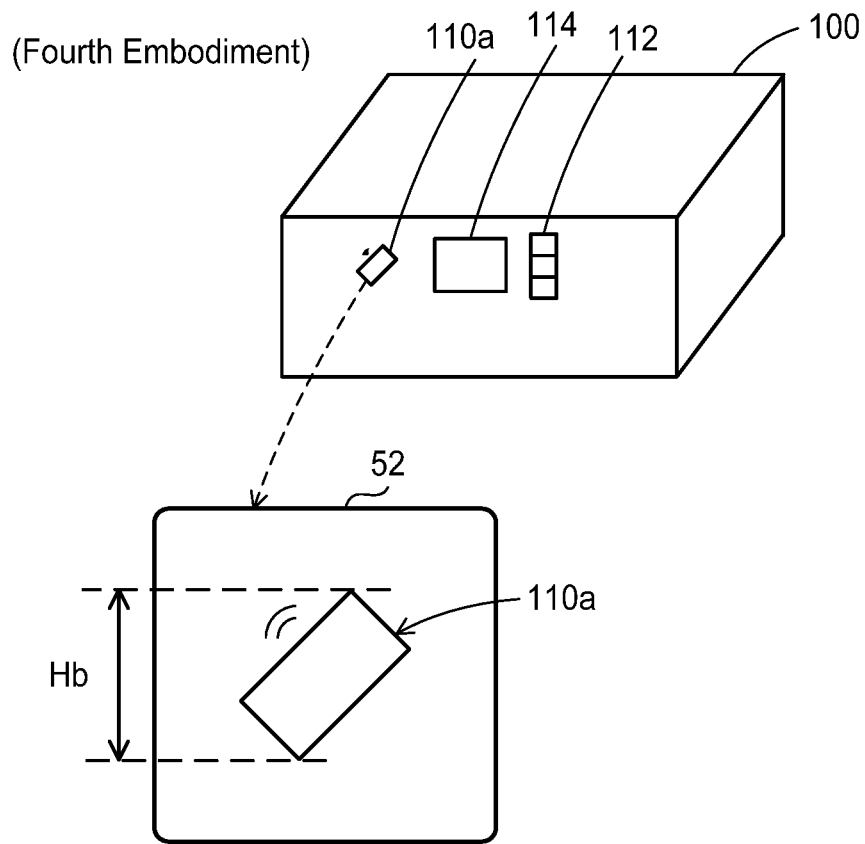
FIGS. 10A and 10B respectively show images of a fourth embodiment.

As shown in FIG. 1, in this embodiment, the memory 44 of the terminal device 10 stores a standard image 52. The standard image 52 will be described with reference to FIG. 10A. An NFC mark 110a, the operation unit 112, and the display unit 114 are provided on a front surface of the MFP 100. The NFC mark 110a is a mark indicating that NFC communication is executable, and is provided near the NFC I/F 132. The standard image 52 is an image obtained when the NFC mark 110a is captured by the image sensor 20 in a state where the distance from the MFP 100 is equal to the threshold value (such as 1 m) (see FIG. 10A). Therefore, when the NFC mark 110a attached to the MFP 100 is captured by the image sensor 20 in the state where the distance between the terminal device 10 and the MFP 100 is less than or equal to the threshold value, this image captured by the image sensor 20 becomes larger than or equal to the standard image 52.

Figure 10B:
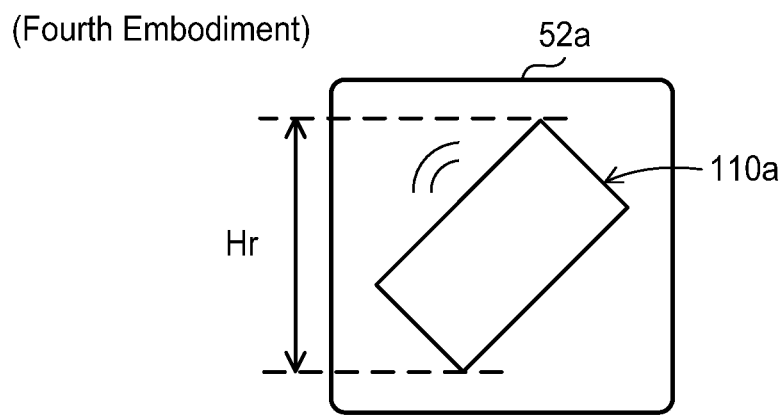

The application 48 supplies the information supply instruction to the OS 46 in S72 of FIG. 3. When the OS 46 acquires the information supply instruction from the application 48, it supplies the application 48 with trigger information which is a signal indicating an image 52a (see FIG. 10B) generated by the image sensor 20.

The application 48 acquires the trigger information from the image sensor 20 via the OS 46 in S74, specifies a height Hr of the NFC mark 110a in the image 52a indicated by the trigger information and determines whether or not the specified height Hr is greater than or equal to a standard height Hb of the NFC mark 110a in the standard image 52 in S76. In a case where the specified height Hr is greater than or equal to the standard height Hb (YES in S76), that is, in a case where the image captured by the image sensor 20 includes the standard image 52, the application 48 determines that the distance between the terminal device 10 and the MFP 100 is less than or equal to the threshold value and proceeds to S80.

On the other hand, in a case where the specified height Hr is less than the standard height Hb (NO in S76), that is, in a case where the image captured by the image sensor 20 does not include the standard image 52, the application 48 determines that the distance between the terminal device 10 and the MFP 100 is greater than the threshold value and proceeds to S78. In this embodiment as well, the user can easily cause the terminal device 10 to execute NFC communication with the MFP 100. In this embodiment, the image sensor 20 and the standard image 52 are respectively examples of "hardware" and "predetermined image".

Fifth Embodiment

In the fifth embodiment, the application 48 uses an illuminance intensity around the terminal device 10 detected by the illuminance sensor 22 to detect that the distance between the terminal device 10 and the MFP 100 is less than or equal to the threshold value (such as 10 cm). The illuminance intensity detected by the illuminance sensor 22 diminishes as the distance between the terminal device 10 and the MFP 100 becomes small.

The application 48 supplies the information supply instruction to the OS 46 in S72 of FIG. 3. When the OS 46 acquires the information supply instruction from the application 48, it supplies the application 48 with trigger information which is a signal indicating the illuminance intensity detected by the illuminance sensor 22.

The application 48 acquires the trigger information from the illuminance sensor 22 via the OS 46 in S74, specifies the illuminance intensity indicated by the trigger information and determines whether or not the specified illuminance intensity is less than or equal to a predetermined illuminance intensity in S76. In a case where the specified illuminance intensity is less than or equal to the predetermined illuminance intensity (YES in S76), the application 48 determines that the distance between the terminal device 10 and the MFP 100 is less than or equal to the threshold value and proceeds to S80. On the other hand, in a case where the specified illuminance intensity is greater than the predetermined illuminance intensity (NO in S76), the application 48 determines that the distance between the terminal device 10 and the MFP 100 is greater than the threshold value and proceeds to S78. In this embodiment as well, the user can easily cause the terminal device 10 to execute NFC communication with the MFP 100. In this embodiment, the illuminance sensor 22 is an example of "hardware".

Sixth Embodiment

Figure 11A:
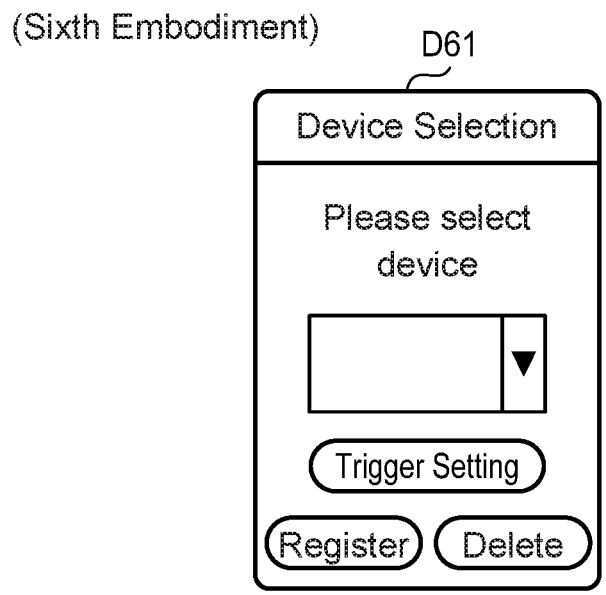
FIGS. 11A and 11B respectively show examples of screens of a sixth embodiment.

In the sixth embodiment, the application 48 uses a motion of the terminal device 10 detected by the acceleration sensor 16 and the gyroscope sensor 18 to detect that a predetermined action was performed by the user on the terminal device 10. In this embodiment, a device selection screen D61 displayed in S10 of FIG. 2 differs from the device selection screen D1 (FIG. 5(A)) of the first embodiment. As shown in FIG. 11A, the device selection screen D61 further includes a registration button and a deletion button.

When the registration button on the device selection screen D61 (see FIG. 11A) is operated by the user, the application 48 starts registration of a predetermined action. Specifically, the application 48 requests the OS 46 to supply an action signal including acceleration information detected by the acceleration sensor 16 and rotation information detected by the gyroscope sensor 18. The application 48 registers the acceleration information and the rotation information included in the action signal, which were acquired from the OS 46 in response to having requested the OS 46 to supply the action signal, in the memory 44 as a predetermined action. The predetermined action may be an action to bring the terminal device 10 closer to the MFP 100 while tilting the terminal device 10 toward an MFP 100 side, for example. When the deletion button on the device selection screen D61 (see FIG. 11A) is operated by the user, the predetermined action registered in the memory 44 is deleted.

Figure 11B:
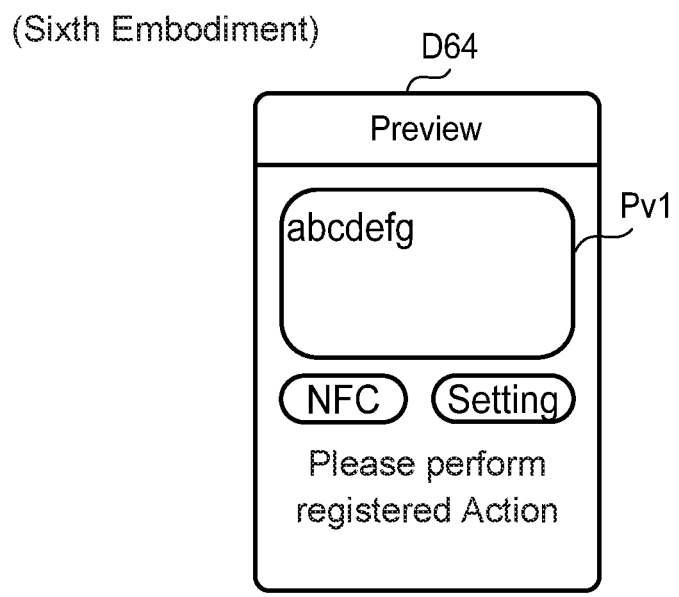

Further, in this embodiment, a print preview screen D64 displayed in S54 of FIG. 3 differs from the print preview screen D4 (FIG. 5(D)) of the first embodiment. As shown in FIG. 11B, the print preview screen D64 includes a message prompting the user to perform the registered action, instead of the message prompting the user to approach the MFP 100.

The application 48 supplies the information supply instruction to the OS 46 in S72 of FIG. 3. When the OS 46 acquires the information supply instruction from the application 48, it supplies the application 48 with trigger information which is an action signal including the acceleration information detected by the acceleration sensor 16 and the rotation information detected by the gyroscope sensor 18.

When the application 48 acquires the trigger information from the acceleration sensor 16 and the gyroscope sensor 18 via the OS 46 in S74, it analyzes the acceleration information and the rotation information included in the trigger information to specify the action that was performed by the user on the terminal device 10 and determines whether or not the specified action matches the predetermined action registered in the memory 44 in S76. The application 48 proceeds to S80 in a case where the specified action matches the predetermined action (YES in S76), and proceeds to S78 in a case where the specified action does not match the predetermined action (NO in S76).

Effects of Sixth Embodiment

The application 48 of the terminal device 10 supplies the trigger instruction to the OS 46 (S80, S120) in the case of determining that the predetermined action was performed by the user on the terminal device 10 (YES in S76 of FIG. 3, YES in S116 of FIG. 4) by using the trigger information which is the action signal including the acceleration information detected by the acceleration sensor 16 and the rotation information detected by the gyroscope sensor 18, even if the NFC button on the print preview screen D64 (see FIG. 11B) is not selected. The user may register an action to bring the terminal device 10 closer to the MFP 100 in the terminal device 10 in advance as the predetermined action, for example. In this case, without having to select the NFC button on the print preview screen D64, the user can easily cause the terminal device 10 to execute NFC communication with the MFP 100 simply by bringing the terminal device 10 closer to the MFP 100. In this embodiment, the trigger information which is the action signal is an example of "first signal".

Seventh Embodiment

In the seventh embodiment, the application 48 detects that the distance between the terminal device 10 and the MFP 100 is less than or equal to the threshold value (such as 1 m) by using the reception strength of the radio wave signal received by the Wi-Fi I/F 30, and further detects that the predetermined action was performed by the user on the terminal device 10 by using the motion of the terminal device 10 detected by the acceleration sensor 16 and the gyroscope sensor 18. A registration method of the predetermined action is same as that of the sixth embodiment. In this embodiment, the print preview screen includes the message prompting the user to approach the MFP 100 and the message prompting the user to perform the registered action.

The application 48 supplies the information supply instruction to the OS 46 in S72 of FIG. 3. When the OS 46 acquires the information supply instruction from the application 48, it supplies the application 48 with trigger information including the reception strength of the radio wave signal received by the Wi-Fi I/F 30 and the action signal including the acceleration information detected by the acceleration sensor 16 and the rotation information detected by the gyroscope sensor 18.

When the application 48 acquires the trigger information from the OS 46 in S74, it specifies the reception strength indicated by the trigger information and determines whether or not the specified reception strength is greater than or equal to the predetermined reception strength in S76. Further, the application 48 analyzes the acceleration information and the rotation information included in the trigger information to specify the action that was performed by the user on the terminal device 10 and determines whether or not the specified action matches the predetermined action registered in the memory 44 in S76. The application 48 proceeds to S80 in a case where the specified reception strength is greater than or equal to the predetermined reception strength and the specified action matches the predetermined action (YES in S76). On the other hand, the application 48 proceeds to S78 in a case where the specified reception strength is less than the predetermined reception strength and/or in a case where the specified action does not match the predetermined action. In this embodiment as well, the user can easily cause the terminal device 10 to execute NFC communication with the MFP 100. In this embodiment, the Wi-Fi I/F 30 is an example of "hardware", "second wireless interface", and "third wireless interface", and the radio wave signal and the action signal are respectively examples of "first signal" and "third signal".

Figure 12:
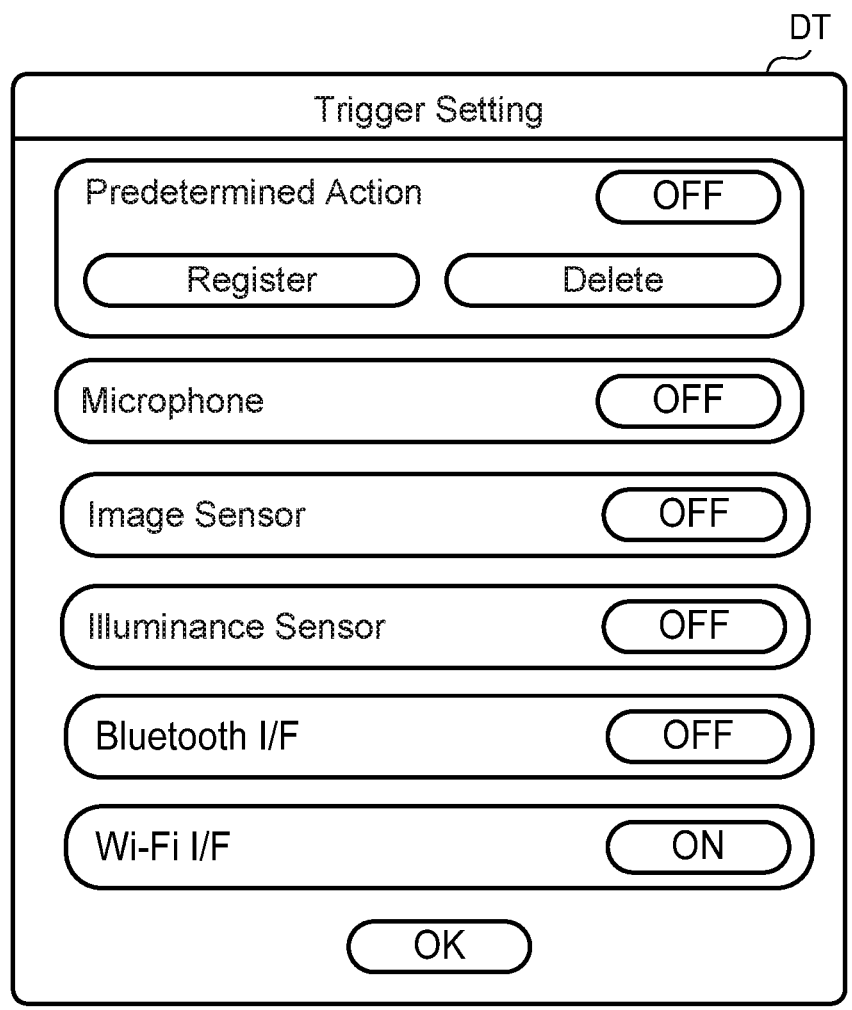
FIG. 12 shows an example of a trigger setting screen.

(Variant 1) The application 48 of the terminal device 10 may be configured to cause the display unit 14 to display a trigger setting screen DT (see FIG. 12) in a case where the trigger setting button on the device selection screen D1 (see FIG. 5A) is selected. The trigger setting screen DT includes a gesture trigger setting box, a microphone trigger setting box, an image sensor trigger setting box, an illuminance sensor trigger setting box, a BT I/F trigger setting box, and a Wi-Fi I/F trigger setting box. The user can switch setting values of the trigger function corresponding to each trigger setting box by operating a button in each trigger setting box.

(Variant 2) The application 48 may not cause the NFC button to be displayed on the preview screen D4 (see FIG. 5(D)) and on the scan setting screen D15 (see FIG. 6(C)) in a case where the trigger setting 50 is set to "ON".

(Variant 3) The terminal device 10 may be provided with only one of the acceleration sensor 16 and the gyroscope sensor 18.

(Variant 4) In the case where the trigger setting 50 is set to "ON", the application 48 may execute S72 to S76 of FIG. 3 even if a screen other than the preview screen D4 (see FIG. 5(D)) and the scan setting screen D15 (see FIG. 6(C)) is displayed on the display unit 14. For example, the application 48 may execute the processes of S72 to S76 in a situation where the print setting screen D5 is displayed, and may execute the processes of S80 to S86 in the case of determining that the reception strength is greater than or equal to the predetermined reception strength.

(Variant 5) The application 48 may be configured to supply the information supply instruction of S72 to the OS 46 and acquire the trigger information from the OS 46 even in the case where the trigger setting 50 is "OFF". In this variant, the application 48 does not execute the process of S76 even if acquiring the trigger information from the OS 46, in the case where the trigger setting 50 is "OFF". The application 48 executes the process of S76 only in the case where the trigger setting 50 is "ON".

(Variant 6) The trigger setting 50 may be set to "ON" in advance, and may not be changeable by the user's operation on the terminal device 10.

(Variant 7) "Communication device" is not limited to the MFP 100, and may be a scanner, a printer, or the like.

(Variant 8) In the above embodiments, the respective processes executed by the controller 40 are implemented by software (that is, the OS program 46 and the print scan application 48), however, at least one of these processes may be implemented by hardware such as a logic circuit.

What is claimed is:

1. A non-transitory computer-readable recording medium storing computer-readable instructions for a terminal device, wherein the terminal device comprises:
   a display unit;
   a first wireless interface;
   a computer;
   an Operating System (OS) program configured to be executed by the computer; and
   a hardware configured to supply a first signal to the computer, the first signal indicating information related to a distance between the terminal device and a communication device;
   wherein the computer-readable instructions, when executed by the computer, cause the terminal device to execute:
   acquiring the first signal from the hardware;
   determining, by using the first signal, whether the distance between the terminal device and the communication device is less than or equal to a threshold value; and
   in a case where it is determined that the distance between the terminal device and the communication device is less than or equal to the threshold value, supplying a trigger instruction to the OS program even if a button that may be displayed on the display unit for supplying the trigger instruction to the OS program is not selected, and
   wherein the trigger instruction is for causing the OS program to execute:
   (1) displaying a notification screen on the display unit, the notification screen being for notifying a user that a wireless communication via the first wireless interface is executable with the communication device; and
   (2) supplying a change instruction to the first wireless interface, the change instruction being for changing a mode related to the wireless communication via the first wireless interface from a disabled state to an enabled state.

2. The non-transitory computer-readable recording medium as in claim 1, wherein
   the hardware is a second wireless interface configured to receive a second signal sent from the communication device,
   the first signal is acquired from the hardware which is the second wireless interface, the first signal indicating a reception strength of the second signal, and
   in a case where the reception strength indicated by the first signal is larger than or equal to a predetermined strength, it is determined that the distance between the terminal device and the communication device is less than or equal to the threshold value.

3. The non-transitory computer-readable recording medium as in claim 1, wherein
the hardware is an image sensor,
the first signal is acquired from the hardware which is the image sensor, the first signal indicating an image, and
in a case where the image indicated by the first signal includes a predetermined image provided on the communication device, it is determined that the distance between the terminal device and the communication device is less than or equal to the threshold value.

4. The non-transitory computer-readable recording medium as in claim 1, wherein
the hardware is an illuminance sensor,
the first signal is acquired from the hardware which is the illuminance sensor, the first signal indicating an illuminance intensity, and
in a case where the illuminance intensity indicated by the first signal is less than or equal to a predetermined illuminance intensity, it is determined that the distance between the terminal device and the communication device is less than or equal to the threshold value.

5. The non-transitory computer-readable recording medium as in claim 1, wherein
the terminal device further comprising at least one sensor of a gyroscope sensor and an acceleration sensor;
wherein the computer-readable instructions, when executed by the computer, further cause the terminal device to execute:
acquiring a third signal from the at least one sensor; and
determining, by using the third signal, whether a predetermined action is performed by the user to the terminal device,
the trigger instruction is supplied to the OS program in a case where it is determined that the distance between the terminal device and the communication device is less than or equal to the threshold value and it is determined that the predetermined action has been performed.

6. The non-transitory computer-readable recording medium as in claim 1, wherein
the computer-readable instructions, when executed by the computer, further cause the terminal device to execute:
displaying a predetermined screen on the display unit;
in a case where the predetermined screen is being displayed on the display unit, the trigger instruction is supplied to the OS program.

7. The non-transitory computer-readable recording medium as in claim 6, wherein
the predetermined screen includes a print preview screen that indicates a print image to be printed by the communication device being capable of executing a print function.

8. The non-transitory computer-readable recording medium as in claim 6, wherein
the predetermined screen includes a scan setting screen for designating a setting of scan to be executed by the communication device being capable of executing a scan function.

9. The non-transitory computer-readable recording medium as in claim 1, wherein
the first wireless interface is configured to execute a short-range wireless communication.

10. The non-transitory computer-readable recording medium as in claim 1, wherein the OS program is configured to receive wireless setting information from the communication device via the first wireless interface in a state where the mode is the enabled state and establish a wireless connection with the communication device via a third wireless interface of the terminal device by using the wireless setting information,
the third wireless interface is different from the first wireless interface,
a communication speed of wireless communication via the third wireless interface is faster than a communication speed of wireless communication via the first wireless interface, and
the computer-readable instructions, when executed by the computer, further cause the terminal device to execute:
executing a wireless communication of target data with the communication device via the third wireless interface by using the wireless connection.

11. The non-transitory computer-readable recording medium as in claim 1, wherein
the terminal device further comprises a memory,
wherein the computer-readable instructions, when executed by the computer, further cause the terminal device to execute:
storing a setting value in the memory, the setting value being designated by the user and being related to supplying of the trigger instruction,
in a case where the setting value in the memory is a first value, the trigger instruction is supplied to the OS program, and
in a case where the setting value in the memory is a second value different from the first value, the trigger instruction is not supplied to the OS program.

12. A non-transitory computer-readable recording medium storing computer-readable instructions for a terminal device,
wherein the terminal device comprises:
a display unit;
a first wireless interface;
a computer;
an Operating System (OS) program configured to be executed by the computer; and
at least one sensor of a gyroscope sensor and an acceleration sensor;
wherein the computer-readable instructions, when executed by the computer, cause the terminal device to execute:
acquiring a first signal from the at least one sensor;
determining, by using the first signal, whether a predetermined action is performed by a user to the terminal device; and
in a case where it is determined that the predetermined action has been performed by the user, supplying a trigger instruction to the OS program even if a button that may be displayed on the display unit for supplying the trigger instruction to the OS program is not selected, and
wherein the trigger instruction is for causing the OS program to execute:
(1) displaying a notification screen on the display unit, the notification screen being for notifying the user that a wireless communication via the first wireless interface is executable with a communication device, and
(2) supplying a change instruction to the first wireless interface, the change instruction being for changing a mode related to the wireless communication via the first wireless interface from a disabled state to an enabled state.

13. The non-transitory computer-readable recording medium as in claim 12, wherein
the computer-readable instructions, when executed by the computer, further cause the terminal device to execute:
displaying a predetermined screen on the display unit;
in a case where the predetermined screen is being displayed on the display unit, the trigger instruction is supplied to the OS program.

14. The non-transitory computer-readable recording medium as in claim 13, wherein
the predetermined screen includes a print preview screen that indicates a print image to be printed by the communication device being capable of executing a print function.

15. The non-transitory computer-readable recording medium as in claim 13, wherein
the predetermined screen includes a scan setting screen for designating a setting of scan to be executed by the communication device being capable of executing a scan function.

16. The non-transitory computer-readable recording medium as in claim 12, wherein
the first wireless interface is configured to execute a short-range wireless communication.

17. The non-transitory computer-readable recording medium as in claim 12, wherein
the OS program is configured to receive wireless setting information from the communication device via the first wireless interface in a state where the mode is the enabled state and establish a wireless connection with the communication device via a third wireless interface of the terminal device by using the wireless setting information,
the third wireless interface is different from the first wireless interface,
a communication speed of wireless communication via the third wireless interface is faster than a communication speed of wireless communication via the first wireless interface, and
the computer-readable instructions, when executed by the computer, further cause the terminal device to execute:
executing a wireless communication of target data with the communication device via the third wireless interface by using the wireless connection.

18. The non-transitory computer-readable recording medium as in claim 12, wherein
the computer-readable instructions, when executed by the computer, further cause the terminal device to execute:
storing a setting value in a memory of the terminal device, the setting value being designated by the user and being related to supplying of the trigger instruction,
in a case where the setting value in the memory is a first value, the trigger instruction is supplied to the OS program, and
in a case where the setting value in the memory is a second value different from the first value, the trigger instruction is not supplied to the OS program.

19. A terminal device comprising:
a display unit;
a first wireless interface;
a computer;
an Operating System (OS) program configured to be executed by the computer;
a hardware configured to supply a first signal to the computer, the first signal indicating information related to a distance between the terminal device and a communication device; and
a memory storing computer-readable instructions therein,
wherein the computer-readable instructions, when executed by the computer, cause the terminal device to execute:
acquiring the first signal from the hardware;
determining, by using the first signal, whether the distance between the terminal device and the communication device is less than or equal to a threshold value; and
in a case where it is determined that the distance between the terminal device and the communication device is less than or equal to the threshold value, supplying a trigger instruction to the OS program even if a button that may be displayed on the display unit for supplying the trigger instruction to the OS program is not selected, and
wherein the trigger instruction is for causing the OS program to execute:
(1) displaying a notification screen on the display unit, the notification screen being for notifying a user that a wireless communication via the first wireless interface is executable with the communication device, and
(2) supplying a change instruction to the first wireless interface, the change instruction being for changing a mode related to the wireless communication via the first wireless interface from a disabled state to an enabled state.

20. A terminal device comprising:
a display unit;
a first wireless interface;
a computer;
an Operating System (OS) program configured to be executed by the computer;
at least one sensor of a gyroscope sensor and an acceleration sensor; and
a memory storing computer-readable instructions therein,
wherein the computer-readable instructions, when executed by the computer, cause the terminal device to execute:
acquiring a first signal from the at least one of the sensors;
determining, by using the first signal, whether a predetermined action is performed by a user to the terminal device; and
in a case where it is determined that the predetermined action has been performed by the user, supplying a trigger instruction to the OS program even if a button that may be displayed on the display unit for supplying the trigger instruction to the OS program is not selected, and
wherein the trigger instruction is for causing the OS program to:
(1) display a notification screen on the display unit, the notification screen being for notifying the user that a wireless communication via the first wireless interface is executable with a communication device, and
(2) supply a change instruction to the first wireless interface, the change instruction being for changing a mode related to the wireless communication via the first wireless interface from a disabled state to an enabled state.

* * * * *